Oct. 22, 1957

G. B. DOREY 2,810,358

LATCHING PAWL AND DOG ASSEMBLY FOR A DUMP DOOR SHAFT

Filed Jan. 6, 1955

INVENTOR.
George B. Dorey,
BY
Robert R. Lockwood
ATTY

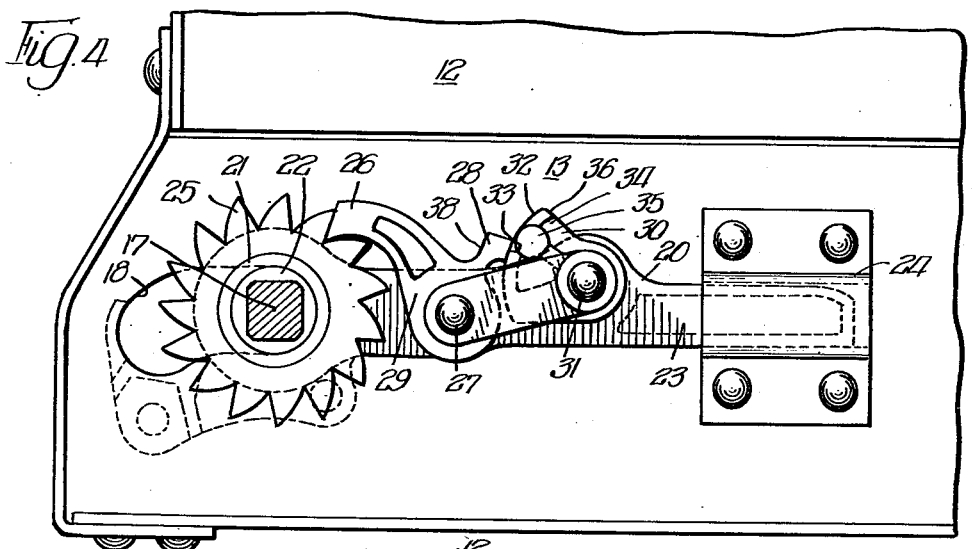
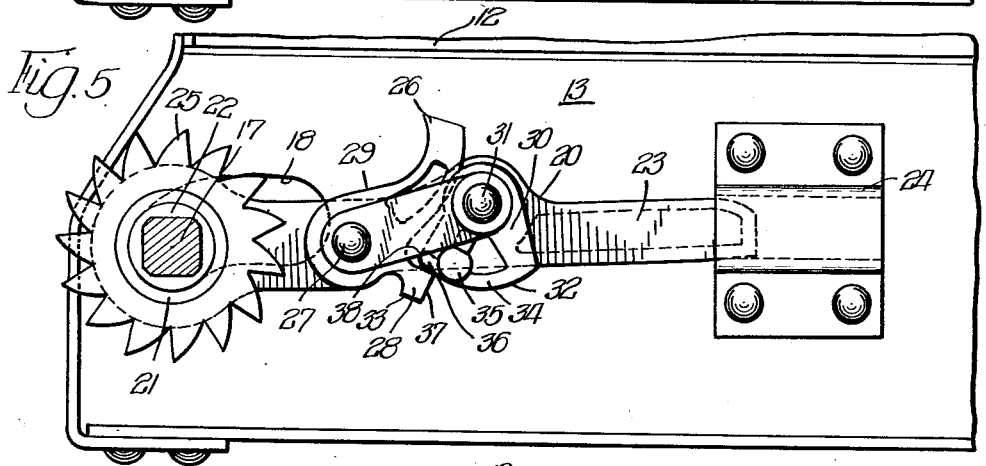
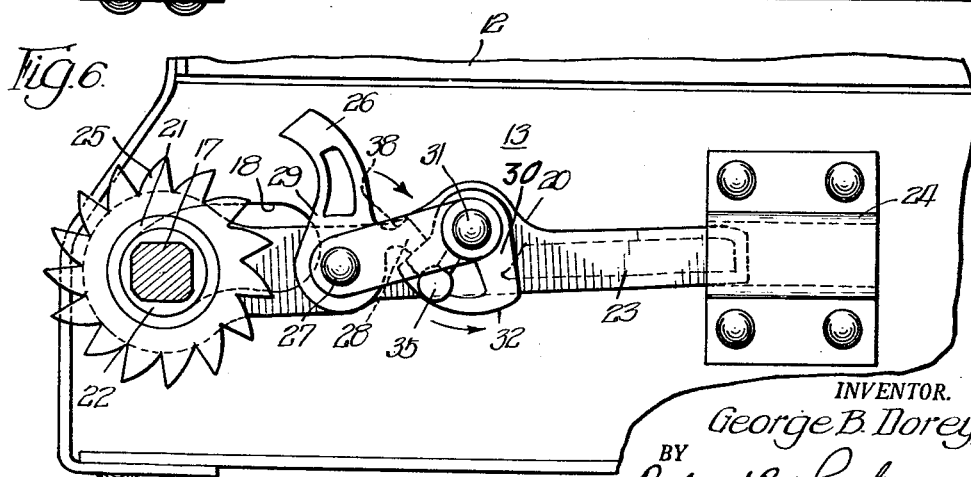

United States Patent Office 2,810,358
Patented Oct. 22, 1957

2,810,358

LATCHING PAWL AND DOG ASSEMBLY FOR A DUMP DOOR SHAFT

George B. Dorey, Westmount, Quebec, Canada, assignor to Enterprise Railway Equipment Company, Chicago, Ill., a corporation of Illinois Application January 6, 1955, Serial No. 480,214

4 Claims. (Cl. 105—309)

This invention relates to an improved latching pawl and dog assembly for a dump door shaft for railway cars and relates to a structure for automatically maintaining a pawl and a dog in overbalanced released position.

The invention is of importance with dump doors which are suddenly released and allowed to drop with the lading. The improvement is particularly desirable in connection with a shaft having a bodily movement of translation in elongated bearings to prevent sudden return of a locking pawl as the shaft is thrown outwardly.

Among the objects of the invention are: To provide cooperating latching pawl and dog latching members wherein the respective members, upon movement of the pawl to an overbalanced position, are adapted to interlock and prevent return movement of the pawl to latching position; to provide a specific form of pawl and dog for automatically effecting interlocking action therebetween; and to provide a suitable assembly structure for adapting the improvement to a bodily movable and rotatable shaft.

For full comprehension of the invention reference may be had to the accompanying drawings wherein the improvement is shown as applied to a bottom and side discharge car, said drawings showing only so much of the car structure as necessary to illustrate the improvement.

In said drawings:

Figure 4 is a vertical sectional view taken adjacent the improved latching mechanism and on a line corresponding generally to a line 4—4 of Figure 1;

Figure 5 is a view, similar to Figure 4, except that the pawl and dog are shown in overbalanced released position and in interlocked relation; and Figure 6 is a fractional view on an enlarged scale of a portion of the structure shown in Figure 4 showing the pawl and dog in an intermediate release position as the tail piece of the pawl makes contact with the dog.

Figure 1:
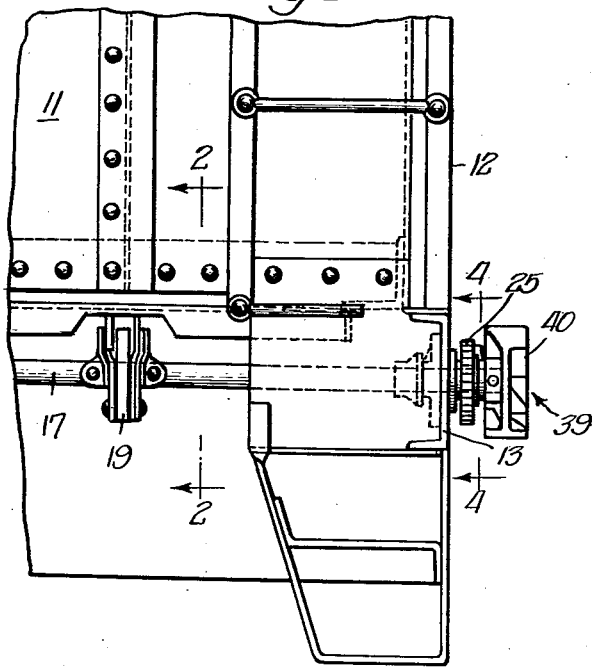
Figure 1 is a side elevational view of the lower portion of the end section of a dump car showing a portion of a door and the latching mechanism concerned with the improved device.
Figure 3:
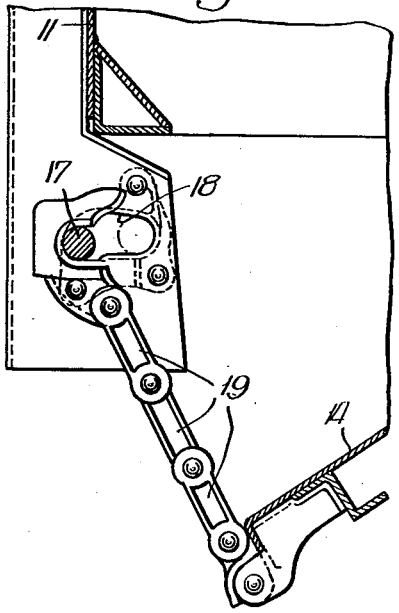
Figure 3 is a view, similar to Figure 2, except that the door is shown in open position with the shaft located in the outer end of the elongated supporting bearing shown.
Figure 2:
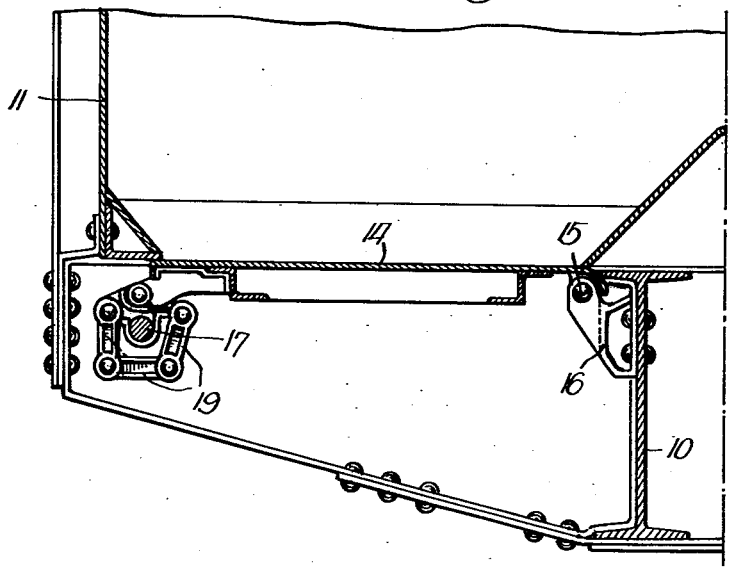
Figure 2 is a vertical sectional view taken through the door and generally on line 2—2 of Figure 1.

In the drawings, 10 indicates the center sill of the car, 11 one of the side walls, 12 one of the end walls of the car, 13 one of the end sills and 14 a dumping door, one of several, hingedly mounted at 15 on hinge butt 16. The door 14 extends towards the side wall 11. A door winding shaft 17 mounted in elongated bearings 18, one of which is shown in Figure 3, is connected with the door 14 by winding linkages 19. The shaft 17 is bodily movable in the bearing 18 between an inner supporting position beneath the door 14 when it comes to closed position, Figure 2, and an outer position, Figure 3, in which the door 14 can swing to the open position.

In order to prevent reverse rotation of the shaft 17 during the lifting operation of the door 14 and subsequently retaining the shaft 17 in supporting position, there is provided the latching mechanism with which the present invention is primarily concerned. The latching mechanism includes a carrier 20 which is supported at one end of the shaft 17, being rotatably associated therewith by reason of a circular bearing 21, Figure 4, in which a hub 22 on the shaft 17 rotates. The opposite end of the carrier 20 is formed with an elongated arm 23 which extends within a guide 24, secured to the end sill 13. The arm 23 moves in the guide 24 as the carrier 20 travels with the shaft 17 in the elongated bearings 18, the carrier 20 thereby being maintained against rotation relative to the shaft 17.

Adjacent to and outwardly of the carrier 20 there is disposed a ratchet wheel 25 which is non-rotatably mounted on the shaft 17. Cooperating with the teeth of the ratchet wheel 25 is a pawl 26 which is pivotally mounted at 27 on the carrier 20. The pawl 26 is provided with a tail piece 28 which extends from the axis of the pivot 27 at an angle to the main body 29 of the pawl 26. A dog 30, which is pivoted at 31 on the carrier 20, is formed with an arcuate shaped cam face 32 which is adapted to register with a face 33 of the tail piece 28 to maintain the pawl 26 in the latched position as shown in Figure 4.

The dog 30 is weighted as at 34 and by operating lug 35 and is thereby biased to hang in an overbalanced pendant position as seen in Figure 5. The dog 30, when in this overbalanced released position, presents a projection 36 which is located in alignment with the tail piece 28 of the pawl 26 and is adapted to be displaced by the former as the latter is swung to overbalanced released position. The body 29 of the pawl 26 is weighted, as described, to assist the releasing swing thereof, it being understood that continued swinging movement of the pawl 26 in a releasing direction operates to displace the dog 30 until the outer end 37 of the tail piece 28 clears the projection 36 of the dog 30 and allows the latter to resume the nomal pendant position as seen in Figure 5.

With the pawl 26 and dog 30 in full released position, as seen in Figure 5, it will be observed that the extension of the arcuate surface of the cam face 32 has now assumed a position above the face 38 of the tail piece 28 and the return of the pawl 26 to latching position is effectively barred.

It will be noted that the entire locking operation is effected automatically upon release of the pawl 26 following the release of the dog 30. The positioning of the pawl 26 and dog 30 intermediate the guide 24 and the shaft 17 renders these members readily accessible for manual operation. Moreover the positioning of the pawl 26 and dog 30 in this location does not interfere with the operation of the dumping doors 14.

The means for rotating the shaft 17 is indicated at 39 in the form of a conventional type of safety bar releasing multiple socket having a plurality of fulcrum sockets 40 designed for one way operation. It will be understood that other suitable rotating means may be employed in lieu of the shaft rotating means 39.

What is claimed as new is:

1. In a dump car having a pivotally mounted dump door, a winding shaft for raising the swinging edge thereof, and a linkage connection between said shaft and door, said connection being adapted to wind around said shaft to raise said door, said shaft having a bodily movement of translation to move into a supporting position beneath said door, in combination; means for preventing reverse rotation of said shaft including a carrier movable therewith, a ratchet wheel thereon, a pawl pivotally mounted on said carrier to engage said ratchet wheel, and a dog pivotally mounted on said carrier to engage said pawl and hold it in latching position; and means for holding said pawl out of engagement with said ratchet wheel including a tail piece extending upwardly from the pivotal axis of said pawl, and a section on said dog adapted to be swung into engagement with said tail piece, said pawl and dog being adapted to be swung to overbalanced released positions and said dog being weighted to dispose said section thereof in the path of movement of said tail piece as said pawl is swung to released position to be displaced by movement of the said tail piece in a releasing direction, said dog being biased to return said section to the path of said tail piece after being displaced by the latter to prevent return movement of said pawl to latching position.

2. In a latching mechanism for a bodily movable and rotatable shaft for operating a dump door and having a ratchet wheel non-rotatably mounted thereon, in combination, a pawl engageable with said wheel for preventing reverse rotation of said shaft, a carrier carried at one end by said shaft, means slidably guiding the opposite end of said carrier, said pawl being pivotally mounted on said carrier intermediate said shaft and guide means and having a body portion with a detent for engaging said ratchet wheel and a tail piece extending at an angle to said body portion, a dog having an arcuate face adapted to engage said tail piece to maintain said pawl in latched position, said pawl and dog being adapted to be swung to overbalanced released positions and said dog being weighted to dispose a section thereof in the path of movement of said tail piece as said pawl is moved to its overbalanced released position and to be displaced thereby to allow movement of said tail piece beyond said arcuate face of said dog in released position, said weighted portion of said dog acting to return the latter to said released portion to engage said tail piece and prevent return movement of said pawl.

3. In a railway car construction, means for cooperating with a ratchet wheel non-rotatably mounted on a shaft comprising, a rockably mounted pawl having a tooth at one end for engaging said ratchet wheel to prevent rotation of said shaft and a tail piece at the other end biasing said pawl to released position, and a dog rockably mounted laterally of said pawl for movement in the plane thereof and biased to released position, said dog being adapted to engage said pawl to hold it in latching position and in released position to have a portion in the path of said tail piece after said pawl is swung to released position to prevent return thereof into engagement with said ratchet wheel, said tail piece having a portion cooperating with said dog to swing it away from its released position as said pawl swings to its released position whereupon said dog swings into the path of said tail piece as aforesaid.

4. In a dump car having a pivotally mounted dump door, a winding shaft for raising the swinging edge thereof, and a linkage connection between said shaft and door, said connection being adapted to wind around said shaft to raise said door, in combination; means for preventing reverse rotation of said shaft including a ratchet wheel thereon, a pivotally mounted pawl for engaging said ratchet wheel, and a pivotally mounted dog for engaging said pawl and holding it in latching position; and means for automatically holding said pawl out of engagement with said ratchet wheel including a tail piece extending upwardly from the pivotal axis of said pawl, and a section on said dog adapted to be swung into engagement with said tail piece, said pawl and dog being adapted to be swung to overbalanced depending released positions and said dog being weighted to dispose said section thereof in the path of movement of said tail piece as said pawl is swung to released position to be displaced by movement of the said tail piece in a releasing direction, said dog being biased to return said section to the path of said tail piece after being displaced by the latter to prevent return movement of said pawl to latching position.

References Cited in the file of this patent
UNITED STATES PATENTS

| | | |
|---|---|---|
| 801,459 | Kendig | Oct. 10, 1905 |
| 1,044,491 | Christianson | Nov. 19, 1912 |
| 1,515,833 | Campbell | Nov. 18, 1924 |